Feb. 3, 1925.
C. T. PALLY
PISTON RING
Filed March 12, 1924
1,525,428
2 Sheets-Sheet 1
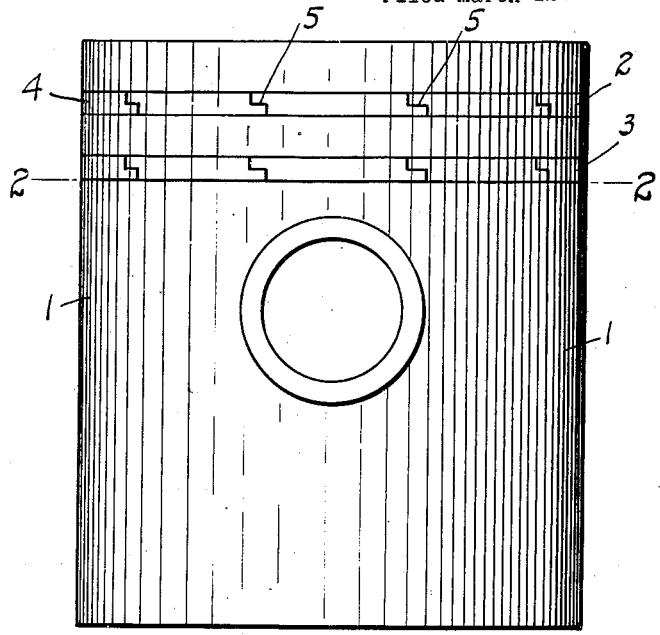
FIG. 1
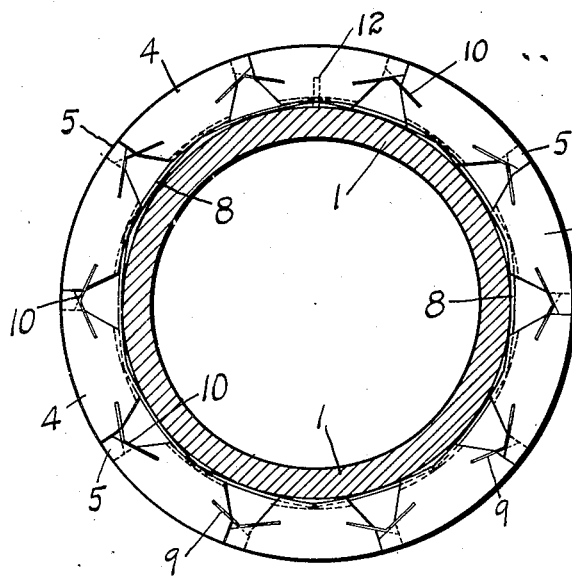
FIG. 2.
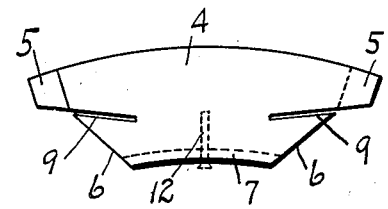
FIG. 5.
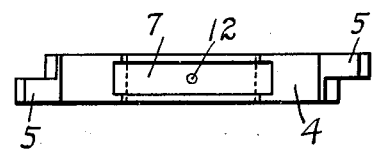
FIG. 6
FIG. 8.
FIG. 7.
INVENTOR.
Charles T. Pally
by John W. Strehli
ATTORNEY.

Feb. 3. 1925.
C. T. PALLY
1,525,428
PISTON RING
Filed March 12, 1924    2 Sheets-Sheet 2
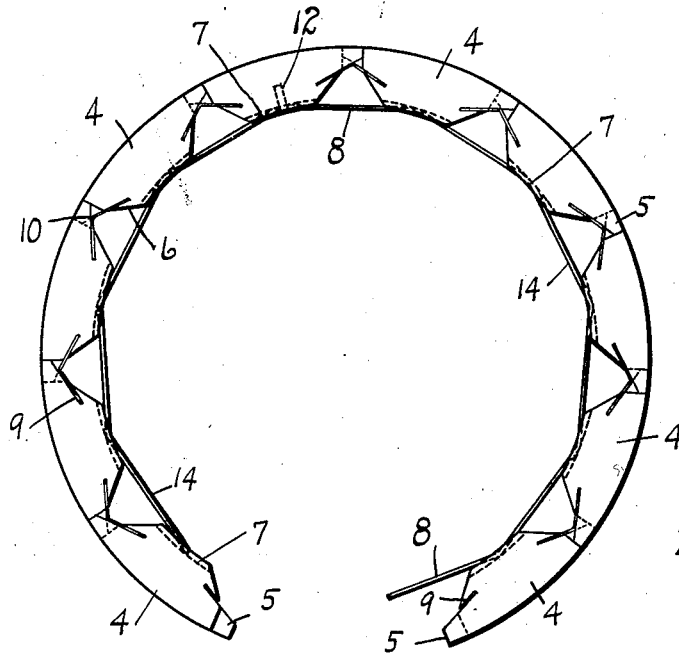
Fig. 3.
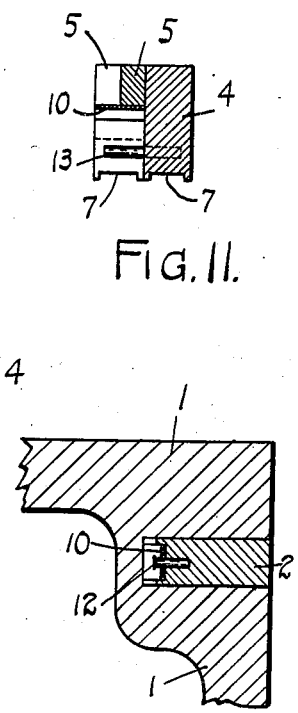
Fig. 11.
Fig. 4.
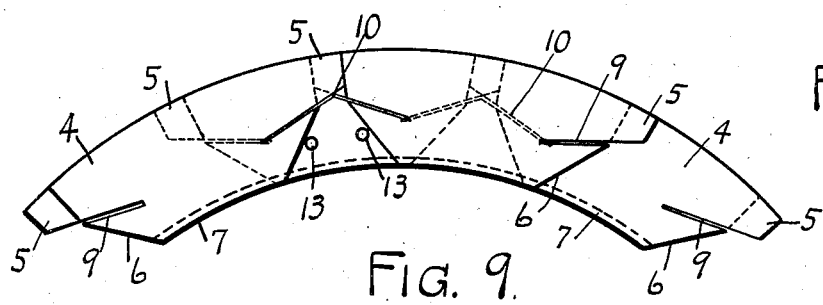
Fig. 9.
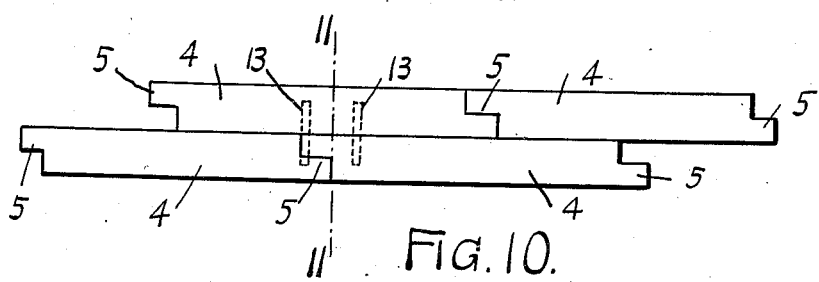
Fig. 10.
Charles T. Pally INVENTOR.
By John W. Strehli ATTORNEY.

Patented Feb. 3, 1925.

1,525,428

UNITED STATES PATENT OFFICE.

CHARLES T. PALLY, OF CINCINNATI, OHIO, ASSIGNOR OF ONE-HALF TO SAMUEL D. PENN, OF CINCINNATI, OHIO.

PISTON RING.

Application filed March 12, 1924. Serial No. 698,651.

*To all whom it may concern:*

Be it known that I, CHARLES T. PALLY, a citizen of the United States, residing at the city of Cincinnati, in the county of Hamilton and State of Ohio, have invented certain new and useful Improvements in Piston Rings, of which the following is a specification.

My present invention relates to a piston ring and belongs to that class in which the piston ring is made up of a multiplicity of sections or sectors, which, when combined together, form the piston ring. These piston rings are as a rule used in connection with the pistons of automobile engines and other motor driven vehicles, although they may be used in connection with other pistons if found desirable. The sections or sectors are held together by a main spring and connecting springs between each two sections or sectors.

It is understood and well known that the cylinders of engines become worn, wavy, and out of true, due to wearing of the cylinder walls, so that the ordinary piston ring on the piston will not conform to the inner faces of said cylinders, thus leakage of gases, oils, and liquids pass the piston rings and impair the efficiency of the engine, and hardly a maximum degree of work can be obtained by the engine.

The object of my invention is to overcome this leakage of gases, liquids, and the like, past the piston rings in such impaired cylinders, and for this purpose I use a multiplicity or plurality of said sections or sectors, lapping each adjoining section to the ends thereof. The outside or peripheral surfaces of each are machined so that my piston ring will equal the diameter of the cylinder bore by the action of a main spring forcing said sectors or sections to the cylinder walls.

In piston rings which are of one piece construction in their circumference, including all which are built up of wedge shaped or flat or off-set layers, a slight pressure on one piece or on one part will cause a considerable portion of the ring to leave the cylinder walls, and further, such rings cannot spring out into a hollow place of the cylinder bore.

These rings exert considerable pressure against the cylinder walls, causing the cylinder walls and rings to wear off rapidly and unevenly, and such rings, when only slightly worn on one or more places will give at such weaker places and cause adjoining parts of the ring where no wear has taken place, to leave the cylinder walls.

In a piston ring made after my invention built up of a plurality of sectors or sections as shown in the drawing, equal and slight, yet sufficient wall pressure is assured. In a true cylinder very little wear will take place, and in an unevenly worn cylinder each sector or section adjusts itself to the cylinder wall by the action of a main spring, which I employ, without affecting the other adjoining sectors or sections. The greater the number of said sectors the better the contact with the cylinder walls will be made, the number of sectors being usually controlled by the size of the cylinder bore and the duty and practicability of the ring.

I use a lap joint between the sectors or sections and it is well known and established that very small leakage is incurred in a plain lap joint.

In the accompanying drawing forming part of this specification:

Fig. 1, is a view of a piston in elevation with the piston ring in position,

Fig. 2, is a section on line 2—2 of Fig. 1, showing the piston ring in closed position and in full lines, Fig. 3, is a plan view of the piston ring fully extended before being placed into position, Fig. 4, is a sectional view of one corner of the piston showing the piston ring in position, also in section, Fig. 5, is a side view of one of the sections of the piston ring, Fig. 6, is an inverted plan view of Fig. 5, Fig. 7, is a side view of the hinged spring, used to hinge the sections together, Fig. 8, is a plan view of Fig. 7, Fig. 9, is a side view of two sections of a double ring construction in one single groove and connected together, Fig. 10, is a plan view of Fig. 9, and Fig. 11, is a section taken on the line 11—11 of Fig. 10.

In the piston 1 I show two piston rings 2 and 3, placed in grooves or recesses in the peripheral face of said piston as is usual in such cases. I may use one or a number of said piston rings, as occasion requires.

In carrying out my invention, I form a ring like annulus, made up of a multiplicity or plurality of sections or sectors 4 of the shape shown, see particularly Figs. 5 and 6, being cut away at each top side edge or end to form tongues or laps 5 so that when two sections or sectors are placed end for end, the tongue in one will overlap the tongue of the other and form a lap joint. Therefore, such a lap joint will be present where said sections lie and come together at their meeting ends. The top and bottom edge or face of each sector is curved so that when they are all put together an outer and an inner circle are described to fit the cylinder wall. At each end, extending downwardly from the lower edge of tongues 5, the edges are cut away to form inclined walls 6, but they may be differently formed.

In the lower or inside face of each section or sector, I form a groove 7, into which enters the main spring 8, and in the ends of each sector or section, I place slots as 9 inwardly, and downwardly inclined into which I place hinge springs 10 which pass into the slot 9 in one end of a section and into the slot 9 in the adjacent section, as shown, so that the hinge spring 10 has, at its apex a dividing line at which it bends for tension or relaxation.

A retaining pin 12 holds the main spring 8 in position against displacement.

In Figs. 9, 10 and 11, I show a double piston ring, that is, two rings placed side by side, in one piston ring groove, but the meeting edges of the sections are not in the same relative position, but are staggered as shown in said Figs. 10, 11, and 12, and are held in this position and relation by pins 13.

The main spring 8 has as many angles 14 as there are sectors, its purpose being to hold sectors to cylinder walls, the flexible jointed sectors aligning themselves according to shape of cylinder walls. Said main spring 8 fits into grooved recesses of sectors to hold sectors in place while assembling and handling ring. When in proper place in cylinder the spring is deflected by the bottom of piston ring groove, to give to sectors the proper amount of force to hold same to cylinder walls.

The purpose of hinge of connecting springs 10 is to hold the sectors together over main spring. The hinge or connecting spring 10 is so shaped as to oppose the action of main spring 8 to a slight degree thereby holding sectors to main spring. For that purpose it is sprung into the corresponding slots 9 in the sectors, at time of assembling of ring. If it were not for the action of this spring the sector ring would have to be assembled in piston ring groove, sector after sector, against the pressure of main spring, an almost impossible procedure, holding a number of such sectors in groove as the joints would snap out of place, a process which would make the sector ring useless. The shape of ring as assembled in factory is similar to a horseshoe, see Fig. 4.

To slip the ring over piston pull ends of main spring 8 apart and slip sideways into piston groove.

The small flexible hinge or connecting springs 10 allow separate movements of the sectors or sections in all directions in fitting and slipping the piston ring into the piston grooves, or fitting rings into cylinders, as said spring provides means of handling the sector ring as a whole ring or unit. In this way the ring can be fitted in the cylinder and the operator can make sure that the piston ring has proper clearance at the ends and does not bind, or is too large in circumference. These connecting springs fit loosely in the slots 9 of the sectors, but due to the strain on said springs, they hold the lap joints of the sectors in their proper position, yet allow a slight movement of the sectors to adjust themselves to the contour of the cylinder bore.

In Figs. 9, 10, and 11, I show a double piston ring construction in one groove. By thus doing I secure an advantage as the object thereof is to prevent having twice the number of sectors in one ring. This construction will take care of any unevenness in the cylinder.

In order to prevent this double piston ring from changing its position and to keep the laps or joints in a staggered position two small pins 13 are inserted in one of the sectors or sections of one ring to fit between two adjoining sectors of the companion ring.

It will, of course, be understood that I do not confine myself to the contour and shape of the sectors or sections and the springs may be of varying shapes, and the sectors may be joined together in a different manner to obtain the same object I obtain in the device herein specifically described, which is a preferred form, and it will be, of course, understood that I may deviate and change the various parts of this construction without departing from the spirit and principle of the invention.

What I claim as new and my invention and desire to secure by Letters Patent is:

1. In a piston ring comprising a plurality of ring sections, the adjacent sections having overlapping end portions, to form a lap joint, each section provided on the inside at its bottom with a groove, a main spring element, said main spring element fitting into said groove, and each section at the point where the overlapping ends form a lap joint, recessed, a spring like hinge, said spring like hinge extending oppositely into said grooves of sections lying adjacent to each other.

2. In a piston ring comprising a plurality of ring sections, the adjacent sections having overlapping end portions, to form a lap joint, each section provided on the inside at its bottom with a groove, a main spring element, said main spring element fitting into said groove, and each section at the point where the overlapping ends form a lap joint, recessed, a spring like hinge, said spring like hinge extending oppositely into said grooves of sections lying adjacent to each other, said main spring element operating to place the ring sections against the inside face of the cylinder wall, and the hinge spring, keeping said sections in normal shape and tending by slight pressure to maintain the sections on the main spring element.

3. In a piston ring comprising a plurality of ring sections, the adjacent sections having overlapping end portions, to form a lap joint, each section provided on the inside at its bottom with a groove, an annular main spring element, said annular main spring element fitting into said groove, and each section at the point where the overlapping ends form a lap joint, recessed, a spring like hinge, said spring like hinge extending oppositely into said grooves of sections lying adjacent to each other.

4. In a piston ring comprising a plurality of ring sections, said sections abutting together at their meeting edges, in combination with oppositely disposed spring elements, one of said elements being a main spring for placing said sections against the inside cylinder wall, to conform to its contour, the other spring elements being hinged springs for holding said sections down on the main spring and exerting slight force against the same and retaining the ring sections in a position against displacement.

In testimony whereof, I affix my signature at Cincinnati, Ohio, this 8th day of March, 1924.

CHARLES T. PALLY.